MAGNETIC PLATE STORE WITH MAGNETIC ROD SWITCHES
INTEGRAL WITH THE PLATE

Filed Aug. 2, 1967

INVENTOR.
HERMANES J.M. DE HAAN
BY
Frank R. Trifari
AGENT

United States Patent Office 3,510,854
Patented May 5, 1970

3,510,854

MAGNETIC PLATE STORE WITH MAGNETIC ROD SWITCHES INTEGRAL WITH THE PLATE

Hermanes Johannus Maria de Haan, Emmasingel, Eindhoven, Netherlands, assignor, by mesne assignments, to U.S. Philips Corporation, New York, N.Y., a corporation of Delaware Filed Aug. 2, 1967, Ser. No. 657,951
Claims priority, application Netherlands, Aug. 3, 1966, 6610902
Int. Cl. G11c *5/04*
U.S. Cl. 340—174 4 Claims

ABSTRACT OF THE DISCLOSURE

A magnetic information storage matrix employing a plurality of parallel apertured plates, each plate storing a number of words and each including a switching rod shaped extension at an edge for each word. The apertures comprising each particular word are serially linked by a common closed loop conductor which is wound a number of times around the rod shaped switching element associated with the particular word group. A further conductor is wound on the rod shaped element and is magnetically coupled thereto. The latter conductor is connected to other conductors on other rods in the same plane to form a row conductor. All of the rods in a single column from plate to plate are linked to form a vertical conductor. Excitation of a particular row and column conductor will provide a word output. Individual apertures within the word are each coupled to a control conductor for individual read-write control.

This invention relates to a three-dimensional word-organised magnetic store.

From "Proceedings of the Institute of Radio Engineers" of March 1957, pp. 325–334, a magnetic store is already known comprising a plurality of stacked plates provided with printed circuits which extend through store elements formed in the plates, these store elements being also coupled to conductors threaded through apertures located one after another in the elements. Store elements belonging to the same word are coupled through a common word conductor to a common magnetic switching element. Further, the switching elements of the various words are arranged in a matrix in rows and columns, the switching elements of the same column being coupled to the same column conductor and the switching elements of the same row being coupled to the same row conductor.

Due to the possibility of using printed circuits and to the otherwise comparatively simple wiring, such stores lend themselves especially to bulk manufacture, so that the cost per store elements can be comparatively low. The dimensions can also be comparatively small. In connection therewith such devices are suitable especially for use in very large stores which comprise, for example, a million store places or more.

In the known arrangement both the store elements and the switching elements are formed by apertures in plates of magnetic material and more particularly store elements of the same word and the associated switching element are formed by apertures at corresponding points in the various plates, in other words, apertures which come to lie behind one another in stacking the plates. This known arrangement has the disadvantage that it is very difficult by means of the switching elements to develop a magnetic flux sufficient for the control of a comparatively large number of store elements, for example 100 or more. It is then necessary to stack a large number of plates for forming the switching elements, so that the total volume is detrimentally affected, for example, doubled, and/or to arrange a plurality of turns on each switching element.

To avoid unduly high control currents in the row conductors and column conductors it is also necessary for these conductors to be coupled to the switching elements via a plurality of turns. However, providing turns on the switching elements means here the repeated threading of conductors through the comparatively small apertures of switching, which involves great difficulty in practice, inter alia because the conductors for forming windings have to be closed outside the plates.

The present invention mitigates these disadvantages.

According to the invention, the store elements of the same word and the associated switching element, together with store elements and switching elements of other words, are arranged on the same plate, and the switching elements are rod-shaped in the form of open magnetic circuits and arranged along at least one edge of the plates and in the plane thereof. The word conductors and the row conductors are formed as printed circuits provided on the plates and the switching elements and the column conductors are formed as coils slipped onto the common rod-shaped switching elements of the same column.

In order that the invention may be readily carried into effect it will now be described in detail, by way of example, with reference to the accompanying diagrammatic drawing, in which.

Figure 1:
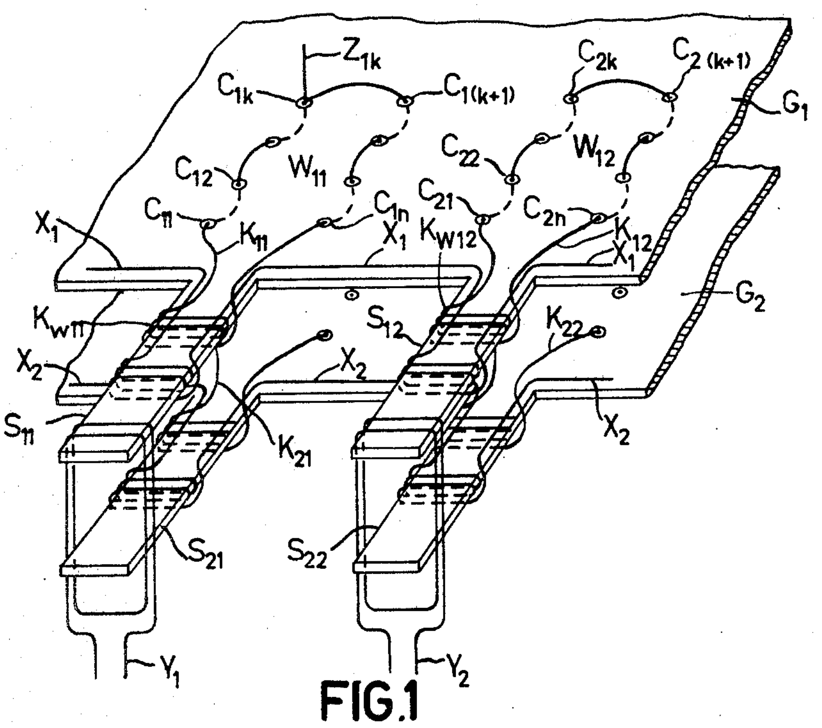
FIG. 1 shows one example of a wiring pattern.

FIG. 1 shows a section, along an edge, of two store plates $G_1$ and $G_2$ made of magnetic material, for example, ferrite or nickel-iron, having a right-angled hysteresis loop. In practice, a store comprises a stack of a comparatively large number of plates. The plates are provided at corresponding points with apertures $C_{11}$, $C_{12} \ldots C_{1k}$, $C_{1(k+1)} \ldots C_{1n}$, etc., which serve in known manner as store elements.

The store elements of the same word ($W_{11}$, $W_{12}$) are coupled through a word conductor $K_{11}$, $K_{12}$, $K_{21}$, $K_{22}$ to associated switching elements $S_{11}$, $S_{12}$, etc. These word conductors are formed on the plates as printed circuits, which are coupled to the switching elements through coupling windings $KW_{11}$, $KW_{12}$ printed thereon and which extend through the apertures of the store elements. To make possible a simple wiring, the store elements of each word are arranged in two parallel rows and the coupling conductors are threaded alternatively up and down through the apertures so as to form a closed loop.

The switching elements $S_{11}$, $S_{12}$ and $S_{21}$, $S_{22}$ on the same plate are coupled to the same horizontal conductors $X_1$ and $X_2$ respectively. These conductors are also formed on the plates as printed circuits, which constitute coupling windings on the rod-shaped projections $S_{11}$, $S_{12}$.

It is fundamentally possible for the two coupling windings to be formed on the switching elements one over the other with the interposition of an insulating layer. However, this requires a plurality of operations in the manufacture.

Figure 2:
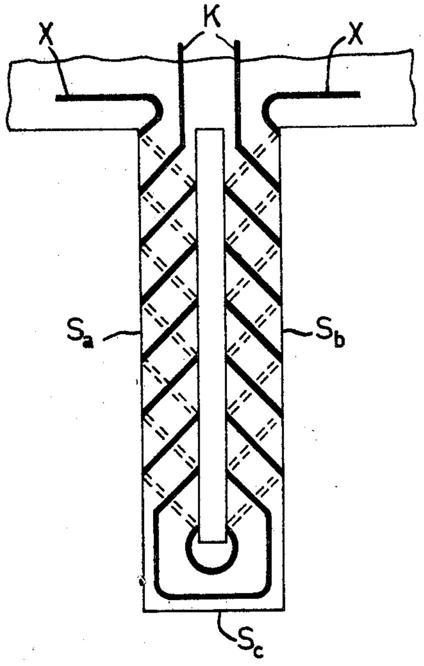
FIG. 2 shows one example of a printed circuit on a switching element.

FIG. 2 shows, by way of example, the manner in which the windings K and X may be formed on the switching elements while avoiding crossings. To this end, the projections are split into two parallel limbs $S_a$ and $S_b$, the free ends of which are coupled together by a coupling part $S_c$. The winding X extends helically on the two limbs $S_a$ and $S_b$, but with opposite winding senses. The ends of the two partial windings are coupled together through the coupling part $S_c$. The winding K is similar to the winding X and extends between the adjacent turns of the latter. When a current is supplied to the winding X the magnetic fields in the two limbs will thus have the same direction.

The switching element thus forms an open magnetic circuit. Experiments have revealed that, if the fineness ratio of the elements is high enough, a strong magnetic coupling occurs between the two windings.

In the manufacture of a store, the printed circuits are first formed on the plates and then the plates are stacked on one another in such manner that corresponding store elements as well as the rod-shaped switching elements come to lie above one another in columns.

Subsequently the switching elements of each column are provided with a common control winding $Y_1$, $Y_2$, etc. This may be effected here in a simple manner by slipping prefabricated coils onto the switching elements.

Further, vertical control conductors, for example $Z_{1k}$, are threaded through the various store apertures $C_{11}$, $C_{12}$, etc. located above one another, such as indicated at $C_{1k}$.

As may appear from the foregoing, there is no objection at all for the various coupling windings and switching elements to comprise a large number of turns, for example, 100, in contradistinction to known arrangements where this causes great difficulty due to the coupling conductors having to be threaded through apertures.

The switching elements are normally magnetically prepolarised in saturation in a given direction. This may be effected, for example, by passing a direct current through the windings X or Y or through a coil (not shown) which embraces all the switching elements. A special advantage of the structure described is that the prepolarisation can also be obtained in a simple maner by means of a permanent magnet, which is very important especially in view of the development of heat.

The performance of the store is, for example, otherwise similar to that of known word-organized stores.

When information has to be read in a given word, for example $W_{11}$, control pulses are simultaneously passed through the windings $X_1$ and $Y_1$ which are coupled to the switching element $S_{11}$.

These pulses have a strength such that the switching elements which are coupled to only one of the two windings keep saturated, but the magnetisation of the element $S_{11}$ varies, resulting in a current pulse being produced in the winding $K_{11}$ coupled to the store elements $C_{11} \ldots C_{1n}$ of the word $W_{11}$. The direction of this pulse is such that the store elements are driven towards the store condition "0." As a result, the store elements, for example $C_{1k}$, which were in the condition "1," are set to the condition "0" in which an output pulse is produced in the vertical conductors, for example $Z_{1k}$, whereas the elements which were already in the condition "0" do not respond, so that no output pulse is produced in the vertical reading conductor coupled therewith.

Subsequently new information may be written in. In fact, when the currents flowing through the windings $X_1$ and $Y_1$ are switched off again, the switching element $S_{11}$ will return to the original state of saturation whereby now a pulse is produced in the word conductor $K_{11}$, which tends to drive all the store elements of the words towards the condition "1."

To write in new information, a prohibitive current is passed, shortly before the currents flowing through the windings $X_1$ and $Y_1$ are switched off, through those vertical conductors, such as $Z_{1k}$, which are coupled to store elements in which the information "L" has to be written, which current has a direction such that it counteracts the action of the pulse on the word conductor $K_{11}$ and has a strength such that the store elements in other plates which are coupled to the relevant vertical conductors are not affected thereby.

In the embodiment described, the store elements are formed by apertures in the plates. Within the scope of the invention they can also be formed in a different way and consist, for example, of three-hole elements known per se.

What I claim is:

1. A word organized magnetic store comprising an apertured plate for storing a plurality of words, a word conductor threading each of said words, a plurality of rod shaped magnetic switching elements mechanically integral with said apertured plate and each associated with one of said words, each said switching element arranged along an edge of said plate, each of said word conductors of each of said words forming a winding of a plurality of turns about the common magnetic switching element associated therewith, a row conductor magnetically linked to each of said magnetic switching elements arranged along the edge of said plate, and a plurality of column conductors, each magnetically linked to one of said magnetic switching elements, each of said words thereby selectable upon a coincidence selection of a row and a column conductor.

2. The combination of claim 1 wherein said word organized magnetic store is three dimensional, including a plurality of stacked apertured plates, said column conductors each magnetically linking a vertical group of switching elements.

3. The combination of claim 1 wherein the word conductors and row conductors are formed as printed circuits on the plates and switching elements.

4. The combination of claim 1 wherein each switching element comprises two relatively parallel rods connected together at their free ends, each rod being provided with two windings in the form of helically extending printed circuits connected to the word conductors and the row conductors respectively, the free ends of the corresponding windings being connected together and the winding senses on the two rods being opposite to each other.

References Cited

UNITED STATES PATENTS

| | | | |
|---|---|---|---|
| 2,784,391 | 3/1957 | Rajchman et al. | 340—174 |
| 3,028,505 | 4/1962 | Rajchman | 307—88 |
| 3,075,184 | 1/1963 | Warman et al. | 340—174 |
| 3,380,039 | 4/1968 | Pick | 340—174 |
| 3,422,407 | 1/1969 | Gould et al. | 340—174 |

OTHER REFERENCES

"Making Ferrite Core-Glass Storage Plane," by B. Schwartz, IBM Technical Disclosure Bulletin, vol. 8, No. 9, February 1966.

BERNARD KONICK, Primary Examiner

KENNETH E. KROSIN, Assistant Examiner